United States Patent Office.

DAVIS EMBREE, OF DAYTON, OHIO.

Letters Patent No. 72,827, dated December 31, 1867.

IMPROVED FOOD FOR STOCK.

*The Schedule referred to in these Letters Patent and making part of the same.*

TO ALL WHOM IT MAY CONCERN:

Be it known that I, DAVIS EMBREE of Enon, in the county of Clark, and State of Ohio, (formerly of Dayton,) have invented a new and useful Improvement in the Mode of Preparing Vegetable Food for Animals; and I do hereby declare that the following is a full, clear, and exact description of the same.

In the preparation of slops in distilleries, in the manufacture of whiskey and other liquors, the nutritious property of the slops, which are left as a residuum, is impaired by the loss of the starch and saccharine matter, and by the creation of injurious acids in the process of fermentation.

My improvements consist, first, in the neutralization of such acids in distillers' slops; second, in restoring the substances that have been extracted, by steeping substances containing these elements in the slop thus prepared; and, third, in the preparation of food from meal and coarse food by the application of steam to the mixture.

In order that distillers' slops may be made fit for use, it is necessary that the acid produced by the fermentation of the "mash" should be neutralized. This I do by adding lime, or other alkaline substances, in quantities to neutralize the acid, and no more. This is effected by adding to the hot slops as drawn off such alkaline substances, gradually testing the slops by the introduction therein of litmus paper from time to time, as each increment of alkaline matter is added, and stopping when the tests applied indicate the entire neutralization of the acids contained in the slop.

The slops thus prepared may be fed directly to the animals in the manner common at distilleries.

The quality of the slops as food is, however, impaired by the extraction of the starch and saccharine matter from the grain, leaving, however, almost unimpaired, the gluten, the most valuable element for the support of animal life. I propose to restore the starch and saccharine matter to the slops by steeping therein, while hot, hay, straw, or other coarse animal food, until the soluble ingredients of such food have been taken up by the slops. The digestibility of the coarse food will be much improved by this saturation and partial cooking in the hot slops; and the slops and coarse food may be fed to the animals either separately or together, as may be most convenient. I propose to apply the same principle to the preparation of food from meal and coarse food, by mixing them together in a close chamber, and turning steam of high pressure upon the same. I prefer to use for this purpose, as the most economical, the escape-steam from an engine. When the steam has been applied long enough to cook the food, and make an infusion of the coarse food in the slops formed by the condensed steam and meal, it may be fed in the same manner, either separately or mixed, as preferred.

By the means set forth, I am able to improve the nutritious properties of distillers' slops, and make a food more nutritious and economical than any now in use.

What I claim as my invention, and desire to secure by Letters Patent, is—

1. The mode of preparing distillers' slops for food, by adding alkaline substances in quantities sufficient to neutralize the acids in the slops, and no more.

2. The mode of restoring to distillers' slops, thus prepared, the starch and saccharine matter taken out in the process of distillation, by steeping coarse animal food in the hot slops, substantially in the manner set forth.

3. The mode of preparing saturated slops from meal, by the application of steam to a mixture of coarse animal food and meal, substantially in the manner set forth.

DAVIS EMBREE.

Witnesses:
R. MASON,
L. MURPHY.